United States Patent [19]
Wober et al.

[11] Patent Number: 5,533,173
[45] Date of Patent: Jul. 2, 1996

[54] METHOD AND APPARATUS FOR PROCESSING A COLOR MAP USING DISCRETE COSINE TRANSFORMS

[75] Inventors: Munib A. Wober, Haverhill; Jinjou Lin, Tewksbury, both of Mass.

[73] Assignee: Polaroid Corporation, Cambridge, Mass.

[21] Appl. No.: 126,339

[22] Filed: Sep. 24, 1993

Related U.S. Application Data

[63] Continuation-in-part of Ser. No. 780,025, Oct. 21, 1991, abandoned.

[51] Int. Cl.$^6$ ................................................ G06K 15/00
[52] U.S. Cl. ........................................ 395/114; 358/432
[58] Field of Search ........................... 395/114, 109, 395/127, 125, 131; 382/56, 47, 250; 348/409, 403, 395; 358/432, 518, 519, 525

[56] References Cited

U.S. PATENT DOCUMENTS

| | | | |
|---|---|---|---|
| 4,719,503 | 1/1988 | Craver et al. | 348/717 |
| 4,970,604 | 11/1990 | Coueignoux | 358/426 |
| 5,103,306 | 4/1992 | Weiman et al. | 348/400 |
| 5,168,375 | 12/1992 | Reisch et al. | 358/432 |
| 5,218,431 | 6/1993 | Gleicher et al. | 348/472 |
| 5,233,684 | 8/1993 | Ulichney | 395/131 |

OTHER PUBLICATIONS

"Discrete Cosine Transform Filtering" by Chitprasert & Rao, Signal Processing 19 (Mar. 1990) pp. 233–245.

Primary Examiner—Mark R. Powell
Assistant Examiner—Tracy M. Legree
Attorney, Agent, or Firm—Robert A. Sabourin

[57] ABSTRACT

A method for processing color mapping data includes the steps of performing a discrete cosine transform on color descriptors resulting in a set of corresponding discrete cosine transform (DCT) coefficients. Selected discrete cosine transform coefficients are set to zero in order to produce a revised set of coefficients including a compressed smaller set of coefficients. The smaller set is more readily manipulated and facilitates interpolation. In one embodiment an inverse DCT is performed on the revised set of coefficients to produce a revised map in color space including a revised set of corresponding device dependent color descriptors. Discrete standard color descriptors are interpolated in the revised map by linear interpolation. In another embodiment of the invention, interpolation is included within an inverse cosine continuous transform (ICCT) of the revised set of coefficients employing an ICCT interpolator. Apparatus for implementing the process includes, for example, a computer, an application specific integrated circuit or a digital signal processor.

19 Claims, 5 Drawing Sheets

METHOD AND APPARATUS FOR PROCESSING A COLOR MAP USING DISCRETE COSINE TRANSFORMS

RELATED APPLICATIONS

This application is a continuation-in-part of U.S. patent application Ser. No. 07/780,025 filed 21 Oct. 1991 by Munib Wober and Jinjou Lin, and now abandoned.

FIELD OF THE INVENTION

The invention relates to color mapping for electronic imaging. More particularly, the invention relates to; a method for compressing color map information to a relatively small number of values; a method of filtering color map data; and a method of interpolating between color map entries.

BACKGROUND OF THE INVENTION

A detailed theoretical discussion of discrete cosine transforms in general is described in Reisch et al. U.S. Pat. No. 5,168,375 issued Dec. 1, 1992 and herein incorporated by reference in its entirety.

Color mapping is a process of converting an image from one color space to another. For example, well known standard sets of device independent color descriptors include CIELAB and CIEXYZ. Known device dependent systems may be characterized by color descriptors for each of three or more primary colors such as RGB, CMY etc. Color mapping can occur between any combination of device dependent and device independent color descriptors.

Various algorithms to map color are currently under development in the electronic imaging field. The performance factors which differentiate these color mapping algorithms include: quality or accuracy of the conversion; the computational time required to transform an image; and the amount of data storage required by the map. In general the algorithms may be implemented in a computer or in specialized hardware such as application specific integrated circuits (ASICS) or more general programmable digital signal processors (DSPs).

In an electronic digital still photographic system, a color image usually consists of three or more bands of quantized data. As a result, each pixel in the image is described by three bytes of data, one for each color band. Typically, the 256 discrete gradations provided by one byte are adequate for visual resolution. For purposes of the discussion herein, it will be assumed that the discretization process has not already introduced quantization artifacts. If the image detection or rendition mechanisms are linear with exposure or if the three color bands are independent but non-linear, color mapping may be implemented in a straightforward procedure using three one dimensional look-up tables and a 3×3 matrix. An electronic camera using a CCD or a CID for transforming the scene image through a series of electrical signals is such a linear detector.

A linear color map can be employed to effect a transformation from digitized electrical signals from a linear detector to a standard or device independent color space, for example, CIEXYZ units. However, the constraints of linearity or independence may not apply to the vast majority of color hard copy devices, i.e., printers. Accordingly, characterization of the printing or hard copy device is necessary in a characterization engine in order to obtain satisfactory tone and color in the hard copy.

Initially, at least one characterization of a hard copy output device is performed. The goal of characterizing the hard copy output device is to be able to compute a standard device independent color descriptor for any device dependent triplet of RGB data. While the CIELAB standard is a preferred device independent space, the same approach applies to any other choice of a device independent color descriptor.

In the interest of reducing quantization error, it is normally desirable to use three one dimensional (1D) look-up tables, such that, equal simultaneous digit increments in R, G and B result in corresponding equal L* increments and preserve a neutral balance (a*=b*=0), thereby linearizing the RGB space. The next step in the characterization process is to construct digital images which sample R, G, B space on a uniform three dimensional grid. A typical grid would equally sample R, G and B in eight steps resulting in 512 samples. These images are then printed and the printed colors are then measured in CIELAB units. The process thereby yields a uniform three dimensional (3D) grid of RGB values and their associated CIELAB values. In effect, the data may be viewed as consisting of three discretely sampled non-linear 3D functions—i.e., L* (R, G, B); a* (R, G, B); b* (R, G, B). All considerations of sampling theory apply. The calibration process enables one to predict by interpolation the CIELAB value that will result from printing any RGB triplet.

The primary function of an electronic printer is to consistently print any specified device independent triplet, whether it is a single pixel in an image or a patch of color. Mapping is the inverse of the above described characterization process, in that, given a L*a*b* triplet, it is desirable to obtain the correct RGB triplet necessary to supply the printer. In other words, given an image expressed in a device independent color space, mapping produces RGB outputs that are required to form the same image in the hard copy or medium.

There are a number of methods of performing this inversion. One that appears to be the fastest is to construct the uniform CIELAB grid, compute and construct corresponding RGB values in a grid and linearly interpolate the closest values from the CIELAB grid in the RGB grid to find the appropriate RGB triplet. The major difficulty in the construction of the uniform CIELAB grid is the proper handling of all the CIELAB triplets in the grid that are outside the gamut of the printer. These problems are typically handled by compromises and approximations, for example gamut tucking, which are known to those skilled in the art. Gamut tucking is a known process by which certain substitute independent color descriptors are used to specify device dependent descriptors which best match the desired color when the device is not capable of producing the desired color descriptors. The grid and its associated compromises make up the map which allows for consistent printing of an original image from data typically expressed in device independent color space values.

Interpolation represents an approximation. For example, in a typical arrangement for a given CIELAB coordinate, the nearest discrete coordinates in the grid are selected. The values are then transferred to the corresponding coordinates on the RGB map. Then a tri-linear (or multi-linear for more than three primary colors) interpolation is performed to ascertain the desired RGB value. FIGS. 1 and 2 illustrate an exemplary interpolation. In FIG. 1 the cube 10 represents a color space in CIELAB units in which the corners 12 of the cube 10 represent a limited number of color descriptors of the image. FIG. 2 represents a color map in RGB space of the cube 10 from FIG. 1. The solid 14 represents the color space defined by the corners of vertices 16. It can be seen that the cube 10 in FIG. 1 translates to a distorted solid 14 in FIG. 2 because the CIELAB and RGB systems describe colors in different ways. If a color in CIELAB space (FIG. 1) is defined by a discrete point corresponding to one of the vertices or corners 12 of the cube 10 then the color may be directly expressed by reference to the corresponding corner 16 of the solid 14 in RGB space (FIG. 2). If the point P occurs in the color space at a location other than at a discrete point or corner 12, the corresponding point P' in RGB must be found by linear interpolation.

The Table I below illustrates a simplified table of values of CIELAB and RGB units for the eight discrete points or corners 12 of the cube 10 and the corresponding discrete points 16 of the solid 14.

TABLE I

| Lab Coordinates | | | RGB Coordinates | | |
|---|---|---|---|---|---|
| L* | a* | b* | R | G | B |
| 0 | 0 | 0 | 0 | 0 | 0 |
| 1 | 0 | 0 | 1.5 | 0 | 0 |
| 0 | 1 | 0 | 0 | 0.75 | 0 |
| 1 | 1 | 0 | 1.5 | 0.75 | 0 |
| 0 | 0 | 1 | 0 | 0 | 1 |
| 1 | 0 | 1 | 2 | 0 | 1.5 |
| 0 | 1 | 1 | 0 | 1 | 1 |
| 1 | 1 | 1 | 1.5 | 1 | 1 |

For simplicity, a one dimensional example is illustrated, i.e. keeping L* and a* on the grid point and only interpolating for the b* point. Thus, for an arbitrary point P having a set of CIELAB coordinates 1, 1, 0.5, the closest CIELAB coordinates are 1,1,0 and 1,1,1 (FIG. 1). The CIELAB coordinates are transferred to the RGB space as 1.5, 0.75, 0 and 1.5, 1, 1 respectively. By linear interpolation of P, the corresponding point P' 1.5, 0.865, 0.5 results (FIG. 2). A 3D case would require a more complex, but straightforward calculation involving as many as eight neighboring points.

It can be readily seen from FIGS. 1 and 2 that interpolation is an approximation because the only known points of correspondence between the two systems are the discrete points 12 and 16 of the corresponding solids 10 and 14. In other words, there is no guarantee that the system will result in a smooth transition from one system to the other.

In order to better assure accuracy and smoothness, it has been found necessary to select a minimum grid size of $16^3$. This creates a minimum of 4096 data points per color band which must be stored and manipulated. It is costly both in terms of processing time, storage requirements and expense to provide such capacity. Accordingly, a simplified technique is desirable.

SUMMARY OF THE INVENTION

The invention described herein overcomes the shortcomings and limitations of the described prior arrangements. In a particular embodiment the invention comprises a method for processing color mapping data from device independent color descriptors to a set of device dependent color descriptors. The method includes the steps of performing a discrete cosine transform of the device dependent color descriptors resulting in a set of corresponding coefficients in the DCT domain. The map can be filtered by setting selected coefficients to zero in order to produce a revised set of coefficients including a smaller compressed subset therein having significant values. The smaller subset is more readily manipulated and facilitates interpolation. In addition, the smaller or compressed subset is more easily stored and transmitted.

In one embodiment of the invention an inverse discrete cosine transform (IDCT) is performed on the revised set of coefficients to produce a revised map in color space. The revised map has a set of corresponding device dependent color descriptors which closely approximate the original map. This revised map is typically beneficially smoothed by the filtering operation. Discrete device dependent color descriptors may be interpolated in the revised map by tri-linear interpolation.

In an other embodiment of the invention, an inverse continuous cosine transformation (ICCT) on the revised set of coefficients is performed employing continuous basis functions of the discrete cosine transform. Interpolation of the device dependent color descriptors is accomplished by evaluating the continuous basis functions with respect to the standard color descriptors. Apparatus for implementing the process includes (for example) a computer, an appropriate digital signal processor, or an application specific integrated circuit.

DETAILED DESCRIPTION OF THE INVENTION

In the description of the color mapping above, it was noted that a color map which satisfies the requirements of accuracy and smoothness has about 4,096 data points per color band. The amount of useful data in such a color map has not been fully investigated despite the fact that the information content of the map has a strong bearing on the sampling rate of the number of grid points actually necessary to represent the map. In other words, without making arbitrary compromises which may produce artifacts and discontinuities, systematic elimination of data points in order to reduce the amount of information or the sampling rate has not been successfully accomplished.

Figure 1:
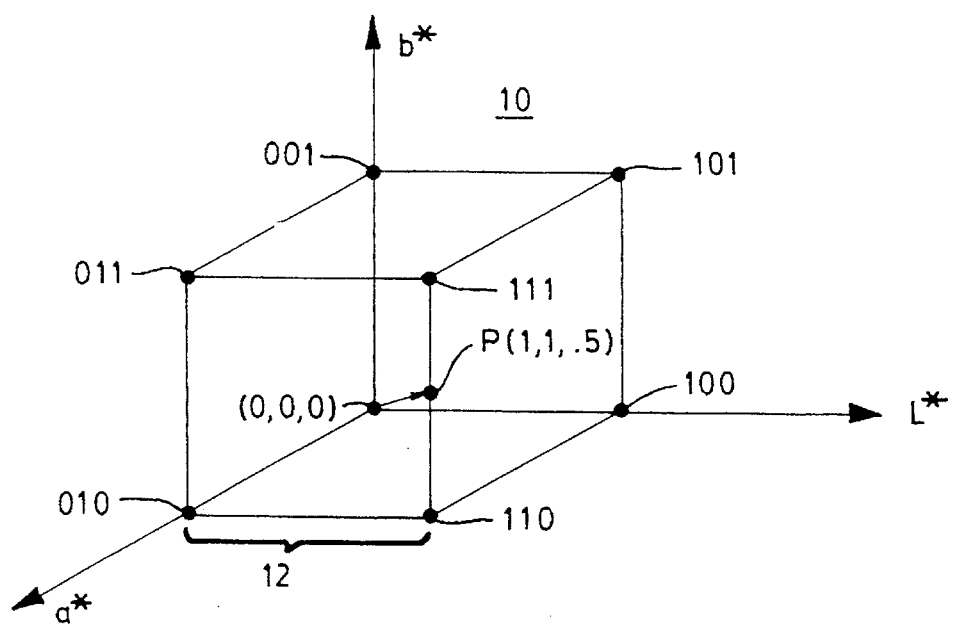
FIG. 1 is a simplified illustration of a region of color space in standard L*a*b* CIELAB units.
Figure 2:
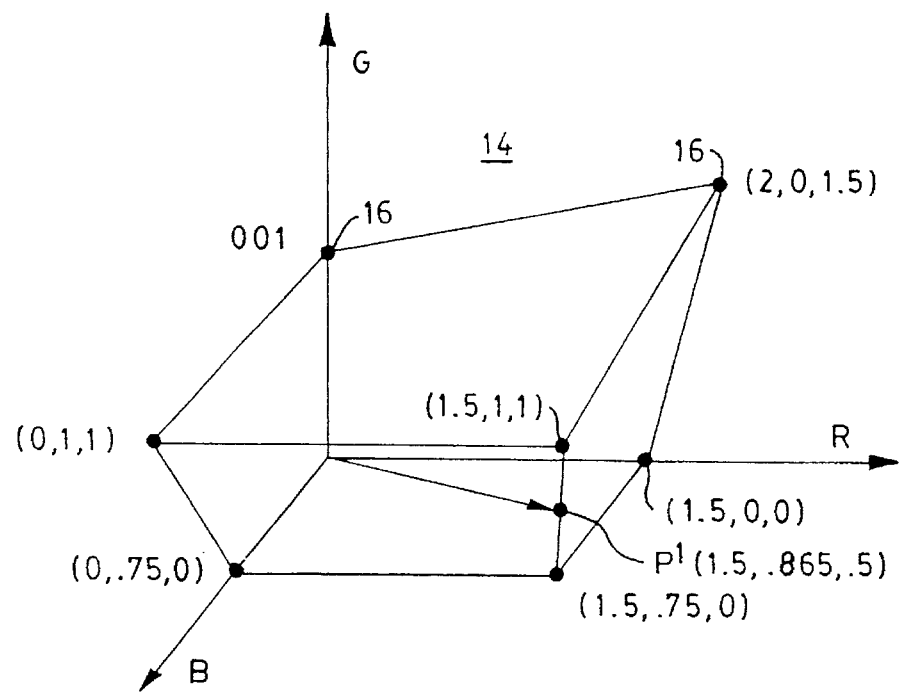
FIG. 2 is a simplified illustration of a map in RGB color space of the color descriptors in FIG. 1.
Figure 3:
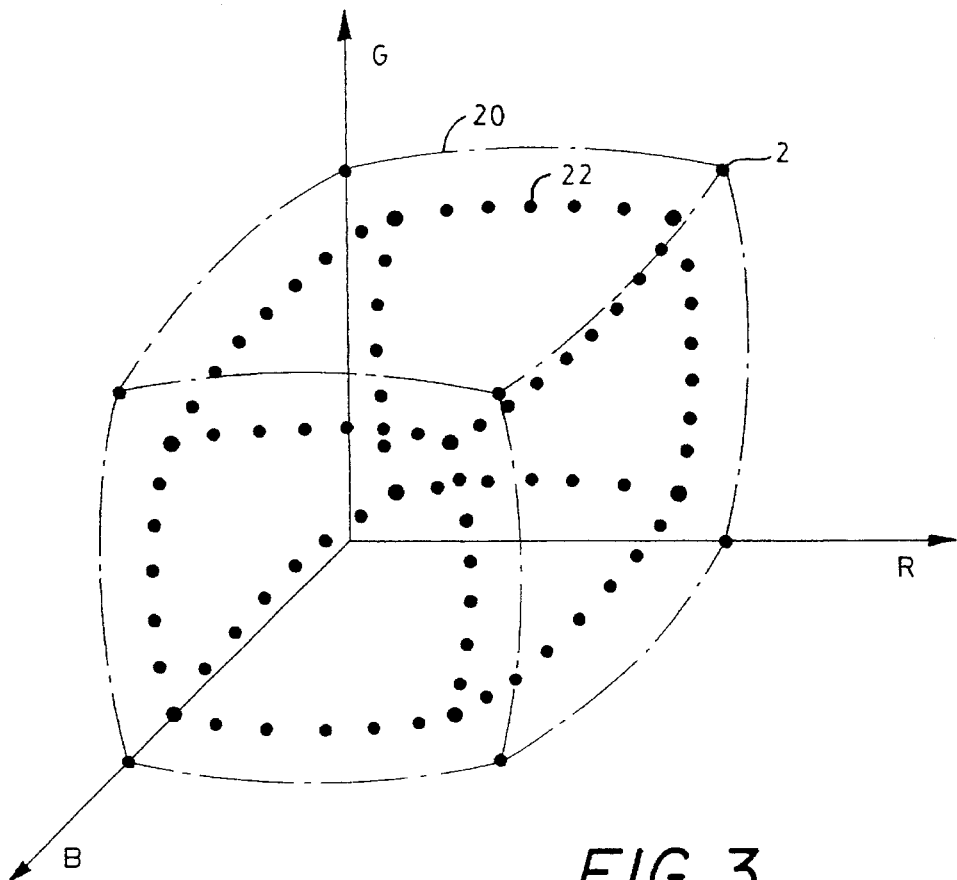
FIG. 3 is an illustration of a 3D color map in RGB space.
Figure 4:
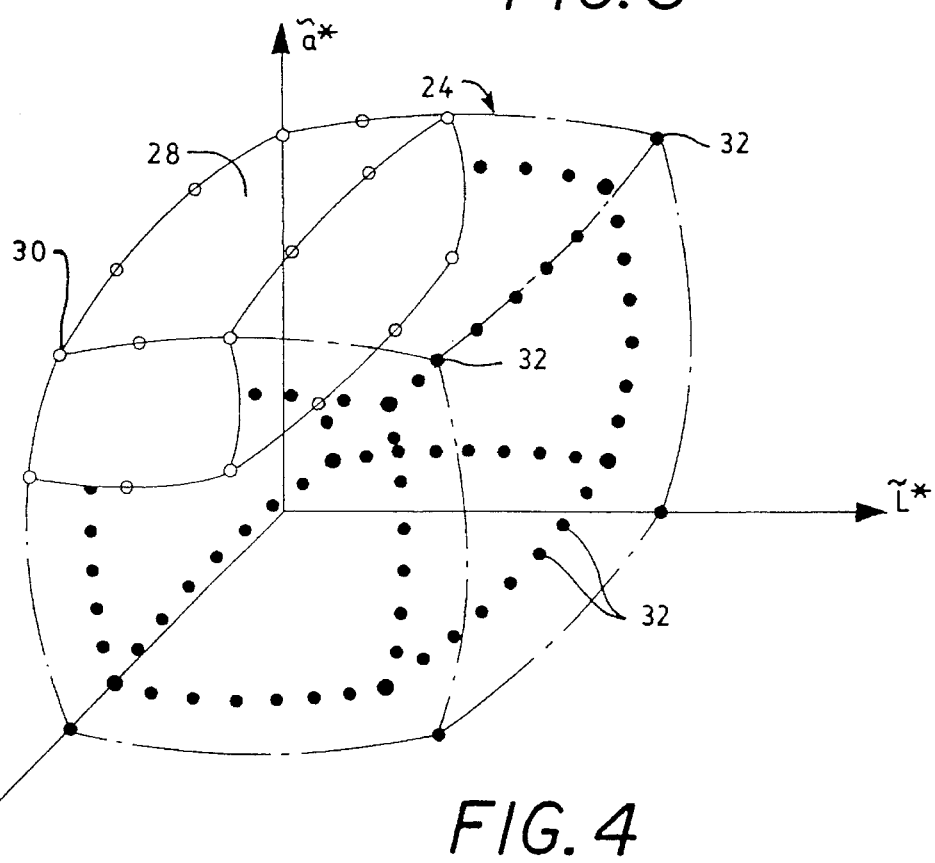
FIG. 4 is an illustration of the 3D color map of FIG. 3 after performing a 3D discrete cosine transform thereon L*a*b* space.

Referring to FIG. 3, an envelope for an exemplary RGB map 20 having contained therein discrete points such as shown at 22 is illustrated. For purposes of illustration the map 20 has $16^3$ or 4096 discrete points per color band within the envelope. In accordance with the present invention the data representing each of the discrete points 22 in the RGB map 20 are subjected to compression utilizing a discrete cosine transform (DCT). In the present invention, an exemplary three dimensional (3D) DCT on the RGB map 20 is performed. The result, illustrated in FIG. 4 is a likewise exemplary matrix 24 of coordinates in the DCT domain (i.e. $\tilde{L}^*, \tilde{a}^*, \tilde{b}^*$) corresponding to the original color space. In FIG. 4 an exemplary 4×3×2 sub matrix 28, located in the upper left hand corner of the matrix 24, has significant coefficients 30 (represented by open circles). The remaining coefficients 32 outside of the submatrix 28 are small and have fluctuating values which indicate that the coefficients 30 represent noise or insignificant data below an acceptable noise floor.

In accordance with the invention the original map 20 of 4096 points per color band effectively collapses to about 24 points (4×3×2) for the example illustrated. In general, all of the data represented by the original 4096 data points can typically be compressed in accordance with the described technique by two orders of magnitude to less than about 50 points. The remaining data 32 outside of the submatrix 28 is set to zero and an IDCT is performed on the resulting coefficients. The result is that a close and accurate reconstruction of the original data in color space is produced. This means that a small number of significant coefficients 30 may be used to accurately represent the original data. Compression without loss of the original data indicates that the original map 20 was grossly oversampled for a number of reasons including a lack of knowledge in the prior art of the appropriate sampling rate. Another reason is the requirement for a smooth map for performing tri-linear or multi-linear interpolation. These smoothness requirements translate into excessive grid densities.

In one embodiment of the invention, color interpolation is performed implementing only significant coefficients 30. The method includes discarding the insignificant data points 32, setting them to zero, and reconstructing a modified or filtered colored map in color space by performing the IDCT on the resulting coefficients. The DCT being an orthogonal unitary transform, leads to well defined nonambiguous inverse coefficients. In addition, the IDCT may be implemented as a fast transform, that is, the inverse transform may be precomputed and simply stored in a table. Linear interpolation may then be performed in the same way that the prior art interpolation is performed.

The method, while effective to produce a smooth color map which will enhance the tri-linear or multi-linear interpolation, still employs numerous data points. Accordingly, an alternative embodiment of the invention may employ direct interpolation using continuous basis functions using ICCT and evaluating the ICCT transform to thereby directly interpolate the results. The method eliminates the large data files because only the significant data points 30 are employed, the remaining points 32 are set to 0 and discarded.

Table II below illustrates in four columns sixteen data points 1–16 in one dimension (e.g. position v. amplitude). The first column is a set of original data points. The second column represents the coefficients resulting from a DCT on the data of column 1. In the third column, the first four coefficients are preserved and the remaining coefficients 5–16 are set to zero. The fourth column represents the reconstructed data after performing an IDCT on the coefficients in column 3. A comparison of the original data and the reconstructed data shows that the differences are insignificant. Therefore, it can be said that the four DCT coefficients are a true and accurate representation of the original data.

TABLE II

| | Original Data | DCT Coefficients | Modified Coefficients | IDCT Reconstructed Data |
|---|---|---|---|---|
| 1 | 0.0000000 | 9.1923885 | 9.1923885 | −0.0676322 |
| 2 | 0.2000000 | −6.1774616 | −6.1774616 | 0.3101563 |
| 3 | 1.0000000 | 0.0000005 | 0.0000005 | 1.0089555 |
| 4 | 2.0000000 | −0.4388143 | −0.4388143 | 1.9316115 |
| 5 | 3.0000000 | 0.0000004 | 0 | 2.9680607 |
| 6 | 4.0000000 | −0.0226676 | 0 | 4.0246649 |
| 7 | 5.0000000 | 0.0000004 | 0 | 5.0459867 |
| 8 | 6.0000000 | 0.0496359 | 0 | 6.0218835 |
| 9 | 7.0000000 | 0.0000000 | 0 | 6.9781160 |
| 10 | 8.0000000 | 0.0481478 | 0 | 7.9540162 |
| 11 | 9.0000000 | 0.0000004 | 0 | 8.9753342 |
| 12 | 10.0000000 | 0.0302097 | 0 | 10.0319433 |
| 13 | 11.0000000 | 0.0000004 | 0 | 11.0683870 |
| 14 | 12.0000000 | 0.0141077 | 0 | 11.9910507 |
| 15 | 12.8000002 | 0.0000005 | 0 | 12.6898460 |
| 16 | 13.0000000 | 0.0038022 | 0 | 13.0676403 |

Figure 5:
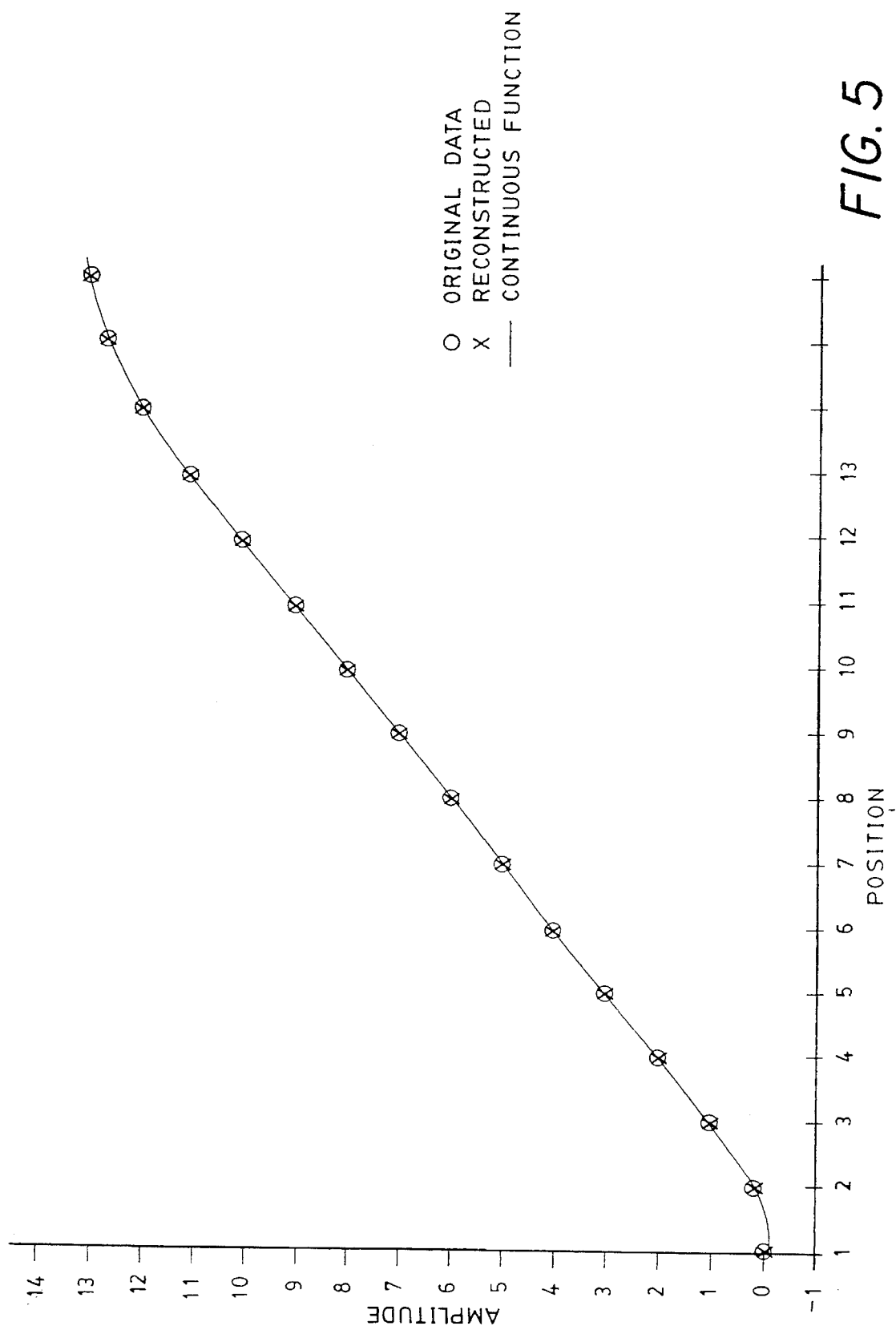
FIG. 5 is an exemplary plot of discrete original 1-dimensional data; the reconstructed discrete 1-dimensional data, reconstructed from a smaller subset of DCT coefficients of the original data; and a continuous interpolation of the reconstructed data using a continuous basis function with those same coefficients.

FIG. 5 is a plot of the original data points from the first column (shown as open circles) and the reconstructed data points from the fourth column (shown as X's). It can be seen that the original and reconstructed data are virtually identical. The smooth solid curve connecting the data points is representative of the continuous function describing the data. In one embodiment of the invention the reconstructed data points may be employed to accurately represent the original data discretely. Alternatively, if a continuous function is substituted for the discrete cosine basis function, the four data points in the third column of Table II are sufficient to construct the continuous curve shown in FIG. 5.

Figure 6:
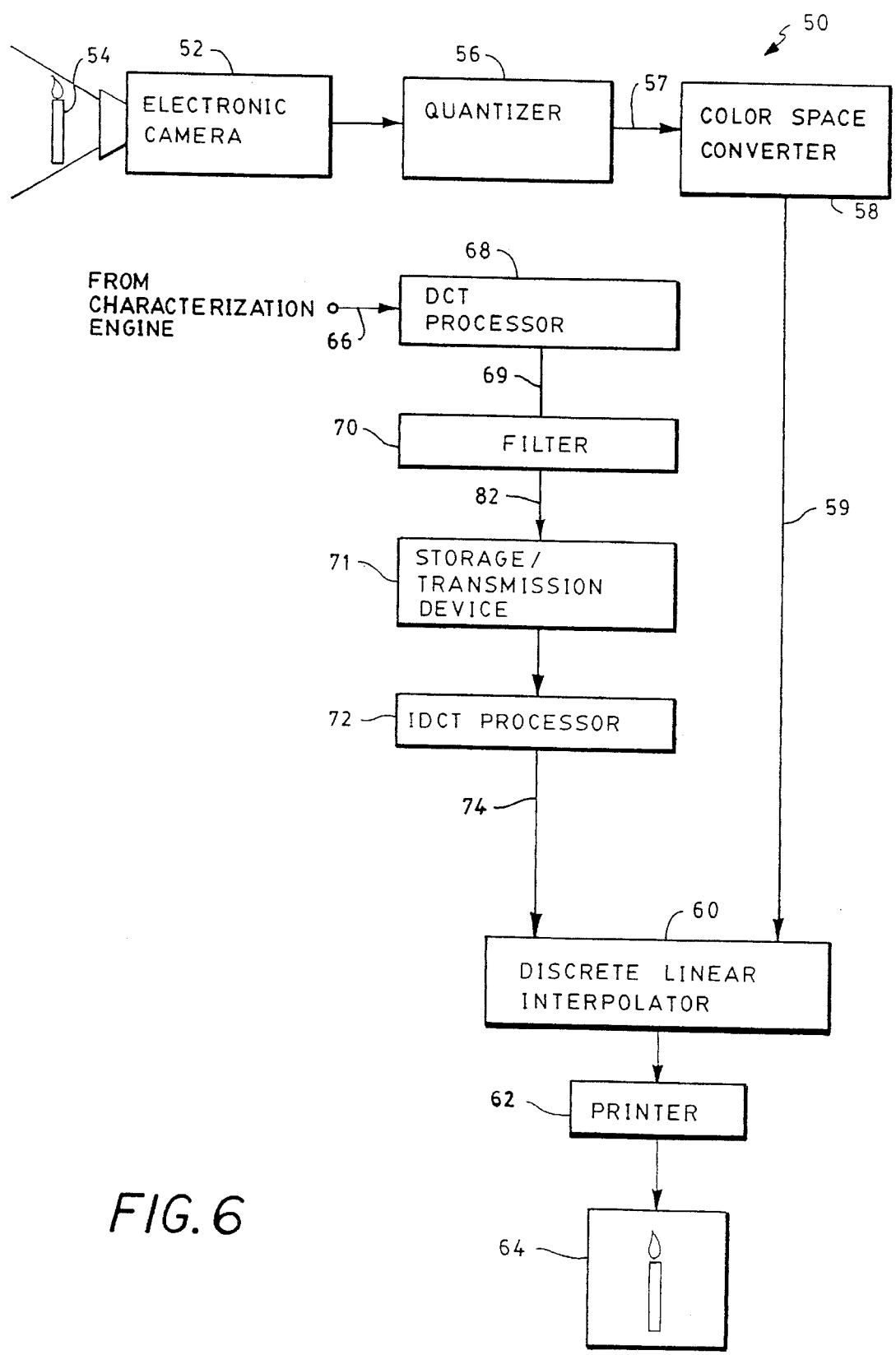
FIG. 6 is a schematic block diagram of an embodiment of the invention using an inverse discrete cosine transform processor.

One embodiment of the invention is described in greater detail with respect to the exemplary block diagram of an image processing apparatus 50 in FIG. 6. An electronic camera 52 scans an image 54 and transfers image data to a quantizer 56. It should be understood that the camera may produce analog or digital image data. In the former case, the quantizer would include an analog to digital converter (not shown). Quantized data which represents the image 54 in device dependent values 57, are converted to device independent digital values 59 (e.g. CIELAB coordinates) in the color space converter 58. The device independent digital values 59 are coupled to a tri-linear multi-linear interpolator 60, the function of which is hereinafter described. A printer 62 is coupled to the interpolator 60 and receives a compatible output whereby, the printer 62 produces a faithful hard copy rendition 64 of the input image 54. As is noted above, the printer 62 or other hard copy device, not illustrated, may be calibrated in a different system of device dependent color coordinates or color space. For example, in FIG. 6 the printer 62 which operates in RGB space is calibrated as previously described. The coordinates are stored in a device independent to device dependent color map 66. In accordance with the invention, the coordinates of the color map 66 are transformed in three dimensions by discrete cosine transform processor 68 to coefficients 69 in the DCT domain. A small number of the coefficients in the region where the frequency is near zero are sufficient to characterize all the data. The remaining values are either very small or are small and fluctuating which indicates that coefficients are not useful indications of color. Accordingly, the transformed data 69 is modified in a filter 70 which sets selected very small or small fluctuating values to zero. The result is a compressed subset of coefficients 82 to be processed. Because the filtered data 82 is greatly compressed it may be stored with greatly reduced storage requirements or rapidly transmitted by means of appropriate equipment. Storage/transmission device 71 serves one or both functions as required. For example, the storage/transmission device 71 requires a significantly reduced storage capacity because the compressed coefficients are significantly reduced in number compared to the transformed coefficients. Likewise the storage/transmission device 71 requires a significantly reduced bandwidth to transmit the compressed coefficients 82 compared to the bandwidth requirements of the DCT coefficients 69 prior to filtering. Accordingly greater processing and transmission efficiencies are achievable by the present invention.

In accordance with one aspect of the invention, this stored or transmitted subset of coefficients 82 is coupled to inverse discrete cosine transform IDCT processor 72 to produce a modified color map 74 in RGB color space. The data calibrated in standard color space is interpolated in the linear discrete interpolator 60 utilizing the modified color RGB map 74. RGB coordinates are transferred to the printer 62 whereby the hard copy of the image 54 is reproduced.

Figure 7:
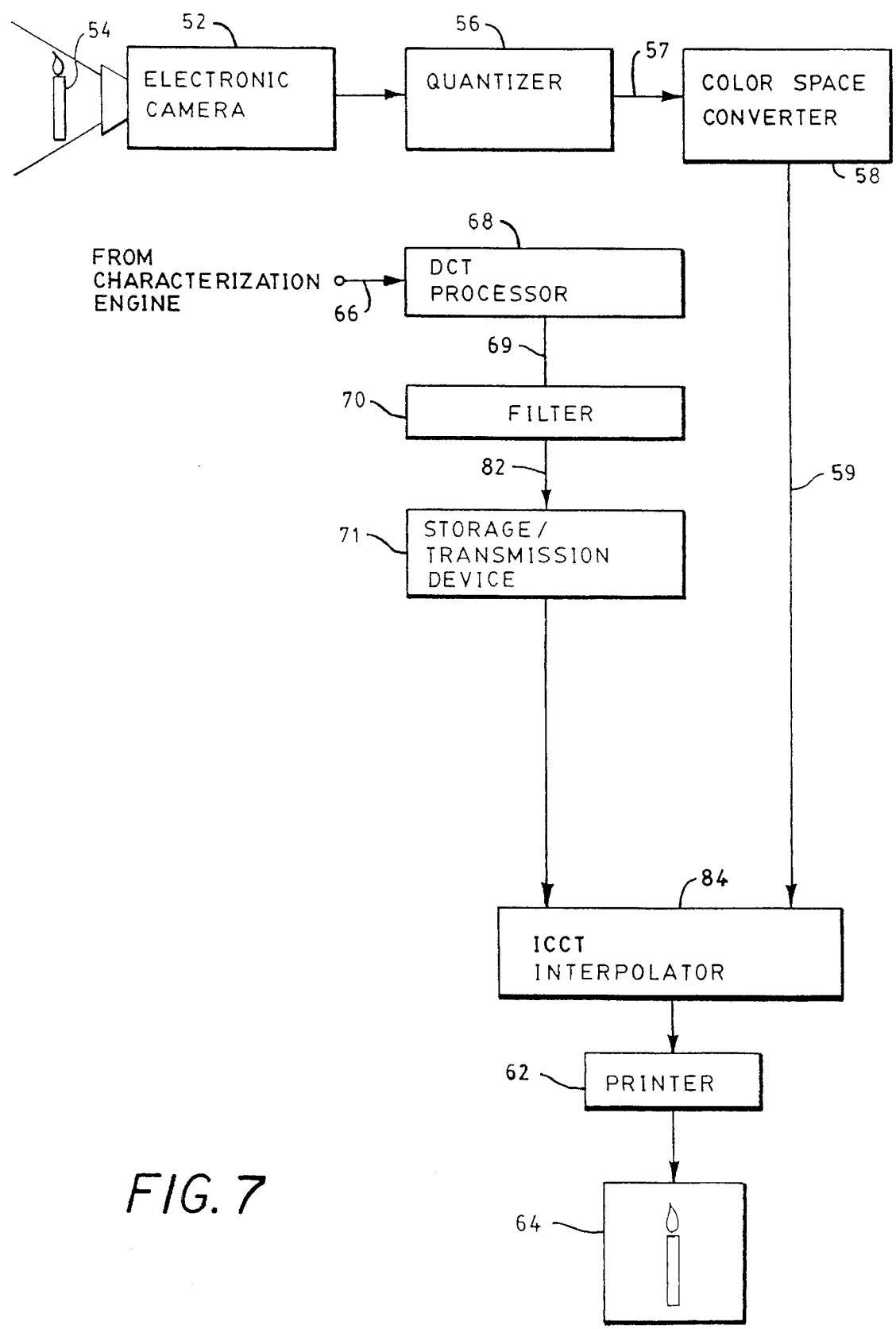
FIG. 7 is a schematic block diagram illustrating an embodiment of the invention using an ICCT interpolator.

In accordance with another embodiment to the invention illustrated in FIG. 7, wherein elements similar to the elements illustrated in FIG. 6 bear the same reference numerals, a simplified image processing apparatus 80, which more efficiently takes advantage of the principles of the invention, is illustrated. In the arrangement, the image 54 is processed in a manner similar to the arrangement of FIG. 6. However, the output of the storage/transmission device 71 is coupled to an inverse continuous cosine transform ICCT interpolator 84. The interpolator 84 substitutes a continuous function into the inverse discrete cosine transform basis functions and evaluates them utilizing the filtered coefficients and the standard color space coordinates to provide appropriate inputs to the printer 62 to thereby produce the accurate rendition of the image 54 and a hard copy 64.

In the primary embodiment of the invention, an inverse DCT on the revised set of coefficients will not be necessary. Instead, the transformation for obtaining the device dependent color descriptors that correspond to a triplet of values of the device independent color descriptors can be constructed by a procedure described below. For the sake of simplicity, this process of obtaining device dependent color descriptors from device independent color descriptors for a display device is described in one dimension. The variable r represents (red) device dependent color and variable x represents (red) device independent color. A map is constructed from N equally spaced values of $x_i$ at which the values of $r_i$ are known. The spacing of x values is $\delta_x$ and i, j and N are integers. The process of obtaining this initial grid is known as calibration.

The DCT coefficients describing the transformations are given by $a_j$. It then follows that:

$$a_j = \sqrt{2/N} \sum_{i=0}^{N-1} d(j) r_i \cos\left[\frac{(2i+1)j\pi}{2N}\right] \quad (1)$$

where:

$$d(j) = \sqrt{\frac{1}{2}} \; ; j = 0$$

$$d(j) = 1; j = 1, \ldots, N-1$$

The coefficients $a_j$ describe a color map. To effect a color transformation, or equivalently a continuous interpolation, for the purpose of obtaining the device dependent color r from a device independent color x, at a value of x which may or may not lie on the original calibration grid $x_i$, the following applies:

$$r(x) = \sqrt{\frac{2}{N}} \sum_{j=0}^{M} d(j) a_j \cos\left[\frac{(2x+\delta x)j\pi}{2N\delta x}\right] \quad (2)$$

where the variable x is constrained to lie in the interval $0 \leq (N-1)\delta_x$. Note that not all the coefficients $a_j$ are used in equation (2) since $M \leq N$. As it turns out, the higher coefficients are very small and may only represent the contribution of noise in the calibration process and may therefore be neglected. The fact that no inverse DCT step is used is significant. The color transform can be effected directly by the evaluation of the previous equation from the known color map coefficients $a_j$.

The extension of the above concept to three dimensions is straightforward. The calibration process involves the construction of a three dimensional grid of size $N_x$, $N_y$, $N_z$ with values $r_i$, $g_j$, $b_k$ for equally spaced values of the color independent descriptors $x_i$, $y_j$, $z_k$ (y corresponds to green and z corresponds to blue). This is then followed by a three dimensional DCT for each of the device dependent descriptors r, g, b to obtain the color map coefficients $a^r_{i,j,k}$, $a^g_{i,j,k}$, $a^b_{i,j,k}$. Only a small fraction of each set of these coefficients are retained. The color transform may then be effected by the three dimensional version of equation (2). The equation for computing r is given by;

$$r(x,y,z) = \sqrt{\frac{2}{N_x}} \sqrt{\frac{2}{N_y}} \sqrt{\frac{2}{N_z}} \sum_{l=0}^{M_x-1} \sum_{m=0}^{M_y-1} \sum_{n=0}^{M_z-1} \quad (3)$$

$$d(l)d(m)d(n) a^r_{l,m,n} \cos\left[\frac{(2x+\delta x)l\pi}{2N_x\delta x}\right] \cos\left[\frac{(2y+\delta y)m\pi}{2N_y\delta y}\right] \cos\left[\frac{(2z+\delta z)n\pi}{2N_z\delta z}\right]$$

where $M_x \leq N_x$, $M_y \leq N_y$, $M_z \leq N_z$ as pointed out in the one dimensional case. Similar equations are used to obtain g and b with appropriate substitutions.

There are circumstances when the calibration grid may not be uniform. In addition, on a uniform grid, when a forward DCT is performed to obtain the color map coefficients $a_j$, the number of coefficients is the same as the number of calibration grid points.

A procedure for obtaining the color map coefficients when the calibration grid is non uniform and the number of data points exceeds the number of desired coefficients follows. The maximum spacing of the grid is $\delta_{max}$, the range of X is $\{0, X_{max}\}$, the number of desired color map coefficients is M and the number of calibration points is N. The color map coefficients $a_j$ may be obtained by minimizing the function $\Phi$ given by:

$$\Phi = \quad (4)$$

$$\sum_{i=0}^{N-1} \| r_i - \sqrt{\frac{2}{M}} \sum_{j=0}^{M-1} d(j) a_j \cos\left[\frac{(2x_i + \delta_{max})j\pi}{2x_{max}}\right] \|^2$$

The sum over j runs from 0 to M where M may not exceed the value $$\left\{ \text{integer}\left(\frac{X_{max}}{\delta_{max}}\right) \right\}.$$

This will prevent aliasing.

For computational simplification, the expression for r(x, y, z) above contains products of cosines. The well known trigonometric identity restates these products of cosines as a sum:

$$r(x,y,z) = \qquad (5)$$

$$\sqrt{\frac{1}{2}} \sqrt{\frac{1}{N_x}} \sqrt{\frac{1}{N_y}} \sqrt{\frac{1}{N_z}} \sum_{l=0}^{M_x-1} \sum_{m=0}^{M_y-1} \sum_{n=0}^{M_z-1}$$

$d(l)d(m)d(n)a^r_{l,m,n}\{\cos(A+B+C)+\cos(A+B-C)+\cos(A-B+C)+\cos(A-B-C)\}$ where A, B, C are simply the arguments of the cosines given above.

It is important to note that there are only as many multiples in this expression as there are coefficients $a^r_{l,m,n}$. The arguments of the cosine and the cosine itself can be stored in a lookup table, In the above examples the DCT coefficients, after filtering, accurately represent in a small number of points what the original data represent in a large number of described points. Also, the small number of coefficients may be used to reconstruct the original data accurately as a continuous function. The exemplary curve in FIG. 5 shows discrete points representing original sixteen data points (open circles) and reconstructed data points (Xs) using four non-zero coefficients out of the original sixteen. The continuous curve in FIG. 5 represents the evaluation of the continuous function using the four non-zero coefficients. The important result is that a highly compressed amount of data can be used to represent a large amount of original data, the original data can be accurately reconstructed as a continuous function using the compressed data, and interpolation using the continuous curve is smooth and accurate without as many data points as has been previously believed to be necessary.

While there has been described what at present is considered to be the preferred embodiments of the invention, it would be apparent to those skilled in the art that various changes and modifications may be made therein without departing from the invention as recited in the claims.

What is claimed is:

1. A method for transforming data between two different color spaces, comprising the steps of:
   generating a color map relating discrete values of the first color space to discrete values of the second color space;
   compressing the color map and generating a set of coefficients for predetermined locations upon the color map by performing a discrete cosine transformation of of said coefficients at said predetermined locations and generating a subset of coefficients by filtering said set of coefficients;
   decompressing said color map to produce a revised color map by performing an inverse discrete cosine transformation of said subset; and
   applying said revised color map to image data from said discrete values of the first color space to generate said image data in said discrete values of the second color space by multi-linear interpolation.

2. The method of claim 1, further comprising the step of setting to zero members of said set of coefficients which are less than a predetermined absolute value.

3. The method of claim 1, further comprising the step of storing said subset in a storage device having less storage capacity than a storage device required to store said set of coefficients.

4. The method of claim 1, further comprising the step of transmitting said subset of coefficients in a transmission channel having a reduced band width requirement compared to a corresponding requirement for transmitting said set of coefficients.

5. A method for processing a color map of data mapping from one color descriptor to another color descriptor, said method comprising:
   a data compression process comprising the steps of generating a set of coefficients by performing a discrete cosine transformation of the color map, and generating a subset of coefficients by filtering said set of coefficients; and
   an interpolation process for interpolating by performing an inverse continuous cosine transformation on image data using said subset of coefficients to transform said image data from said one color descriptor to said another color descriptor.

6. The method of claim 5, further comprising the step of setting to zero members of said set of coefficients which are less than a predetermined absolute value.

7. The method of claim 5, further comprising the step of storing said subset in a storage device having less storage capacity than a storage device required to store said set of coefficients.

8. The method of claim 5, further comprising the step of transmitting said subset of coefficients in a transmission channel having a reduced band width requirement compared to a corresponding requirement for transmitting said set of coefficients.

9. Apparatus for processing a color map of data from one color descriptor to another color descriptor, said apparatus comprising:
   a discrete cosine transform processor for producing a set of coefficients by performing a discrete cosine transformation of the color map;
   a filter for providing a subset of said set of coefficients by filtering said set of coefficients according to a predetermined absolute value; and
   an inverse continuous cosine transform processor for interpolating by performing an inverse continuous cosine transformation on image data using said subset of coefficients to transform said image data from said one color descriptor to said another color descriptor.

10. The apparatus of claim 9, wherein said filter provides said subset by setting to zero members of said set of coefficients which are less than the predetermined absolute value.

11. The apparatus of claim 9, further comprising a memory for storing said subset of coefficients having less storage space than required to store said set of coefficients.

12. The apparatus of claim 9, further comprising a transmitter for transmitting said subset of coefficients in a transmission channel having a reduced bandwidth requirement compared to a bandwidth requirement for transmitting said set of coefficients.

13. Apparatus for processing a color map of data from one color descriptor to another color descriptor, said apparatus comprising:
   a discrete cosine transform processor for producing a set of coefficients by performing a discrete cosine transformation of the color map;
   a filter for providing a subset of said set of coefficients by filtering said set of coefficients according to a predetermined absolute value; and an inverse discrete cosine transform processor for providing a revised color map by performing an inverse discrete cosine transformation of said subset, wherein said discrete cosine transform processor further comprises a linear interpolator for multi-linear interpolation for applying said revised color map to image data from said one color descriptor to generate said image data in said another color descriptor.

14. The apparatus of claim 13, wherein said discrete cosine transform processor further comprises a linear interpolator for one of tri-linear and multi-linear interpolation for applying said revised color map to image data from said one color descriptor to generate said image data in said another color descriptor.

15. The apparatus of claim 13, wherein said filter provides said subset by setting to zero members of said set of coefficients which are less than the predetermined absolute value.

16. The apparatus of claim 13, further comprising a memory for storing said subset of coefficients having less storage space than required to store said set of coefficients.

17. The apparatus of claim 13, further comprising a transmitter for transmitting said subset of coefficients in a transmission channel having a reduced bandwidth requirement compared to a bandwidth requirement for transmitting said set of coefficients.

18. A method for processing a color map from one color descriptor to another color descriptor, comprising the steps of:

producing a revised color map by performing an inverse discrete cosine transformation of a set of coefficients corresponding to the color map; and one of tri-linear and multi-linear interpolation for applying said revised color map to image data from said one color descriptor to generate said image data in said another color descriptor.

19. A method for processing a color map from one color descriptor to another color descriptor, comprising the step of interpolating by performing an inverse continuous cosine transformation on image data using a set of coefficients, corresponding to the color map, to transform said image data from said one color descriptor to said another color descriptor.

* * * * *